(12) United States Patent
Maxim

(10) Patent No.: US 9,771,898 B2
(45) Date of Patent: Sep. 26, 2017

(54) MIXING VALVE OF AN INTERNAL COMBUSTION ENGINE

(71) Applicant: Daniel Iosif Maxim, Timisoara (RO)

(72) Inventor: Daniel Iosif Maxim, Timisoara (RO)

(73) Assignee: Continental Automotive GmbH, Hannover (DE)

( * ) Notice: Subject to any disclaimer, the term of this patent is extended or adjusted under 35 U.S.C. 154(b) by 218 days.

(21) Appl. No.: 14/399,872

(22) PCT Filed: Apr. 30, 2013

(86) PCT No.: PCT/EP2013/058961
§ 371 (c)(1),
(2) Date: Nov. 7, 2014

(87) PCT Pub. No.: WO2013/167423
PCT Pub. Date: Nov. 14, 2013

(65) Prior Publication Data
US 2015/0107707 A1    Apr. 23, 2015

(30) Foreign Application Priority Data
May 9, 2012   (EP) .................................. 12464007

(51) Int. Cl.
*F02B 47/08*    (2006.01)
*F02M 25/07*    (2006.01)
(Continued)

(52) U.S. Cl.
CPC ........ *F02M 25/0786* (2013.01); *F02M 26/21* (2016.02); *F02M 26/51* (2016.02); *F02M 26/54* (2016.02); *F02M 26/64* (2016.02); *F02M 26/69* (2016.02); *F02M 26/70* (2016.02); *F02M 26/71* (2016.02); *F16K 1/22* (2013.01); *F16K 11/14* (2013.01); *F16K 11/22* (2013.01); *F16K 19/00* (2013.01); *F16K 31/041* (2013.01); *F16K 31/043* (2013.01); *F16K 31/535* (2013.01); *F16H 2035/003* (2013.01); *Y10T 137/87692* (2015.04)

(58) Field of Classification Search
CPC .............. F02D 41/007; F02M 25/0798; F02M 25/0786; F02M 25/0707; F02M 25/074; F02M 25/0701
USPC ................. 123/568.11–568.32; 251/248, 279
See application file for complete search history.

(56) References Cited

U.S. PATENT DOCUMENTS 4,838,226 A   6/1989   Matsuzawa et al.
5,562,081 A   10/1996  Hitchcock
(Continued)

FOREIGN PATENT DOCUMENTS

CN         1165547       11/1997
DE    10 2005 028374 A1  12/2006
(Continued)

*Primary Examiner* — Syed O Hasan
(74) *Attorney, Agent, or Firm* — Cozen O'Connor

(57) ABSTRACT

A mixing valve of an internal combustion engine of a motor vehicle includes: a flap arranged in a suction channel and a flap arranged in an exhaust gas channel. One single flap of the two flaps is drivable via a gear pair with non-round or eccentric gears. The drive of the other flap has lost motion, whereby the closing movements of the flaps can be formed in a particularly free manner with only a single actuating motor.

8 Claims, 4 Drawing Sheets

(51) Int. Cl.
*F16K 31/44* (2006.01)
*F16K 31/53* (2006.01)
*F16K 31/04* (2006.01)
*F16K 11/22* (2006.01)
*F16K 1/22* (2006.01)
*F16K 11/14* (2006.01)
*F16K 11/00* (2006.01)
*F02M 26/69* (2016.01)
*F02M 26/21* (2016.01)
*F02M 26/54* (2016.01)
*F02M 26/64* (2016.01)
*F02M 26/70* (2016.01)
*F02M 26/71* (2016.01)
*F02M 26/51* (2016.01)
*F16H 35/00* (2006.01)

(56) References Cited

U.S. PATENT DOCUMENTS

| | | | |
|---|---|---|---|
| 6,820,590 | B2 | 11/2004 | Muraji |
| 8,862,369 | B2* | 10/2014 | Vitiello ............... F02D 11/10 |
| | | | 123/568.12 |
| 9,145,854 | B2* | 9/2015 | Hodebourg ......... F02D 41/0077 |
| 2005/0241702 | A1 | 11/2005 | Blomquist et al. |
| 2006/0283430 | A1 | 12/2006 | Atkinson |
| 2012/0056118 | A1* | 3/2012 | Yokoyama ............. F16K 1/223 |
| | | | 251/248 |

FOREIGN PATENT DOCUMENTS

| | | |
|---|---|---|
| DE | 10 2011 053664 A1 | 4/2012 |
| EP | 1 329 618 A1 | 7/2003 |
| EP | 2 317 111 A1 | 5/2011 |
| JP | 2007-002846 | 1/2007 |
| JP | 2012-062826 | 3/2012 |

* cited by examiner

MIXING VALVE OF AN INTERNAL COMBUSTION ENGINE

CROSS-REFERENCE TO RELATED APPLICATIONS

This is a U.S. national stage of application No. PCT/EP2013/058961, filed on 30 Apr. 2013, which claims priority to the European Application No. EP 12464007.9 filed 9 May 2012, the content of both incorporated herein by reference.

BACKGROUND OF THE INVENTION

1. Field of the Invention

The invention relates to a mixing valve of an internal combustion engine of a motor vehicle, having a flap arranged in an intake duct and a flap arranged in an exhaust duct, having shafts, which are rotatably mounted in a housing and hold the flaps, wherein the intake duct and the exhaust duct open into a common combined duct, and having a driving device for driving the flaps.

2. Related Art

Mixing valves of this kind are often used in exhaust gas recirculation systems of internal combustion engines of modern motor vehicles and are known in practice. The movements of the flaps of the intake duct and of the exhaust duct are controlled such that, starting from the first position, the flap arranged in the exhaust duct opens linearly with a control signal of the driving device. However, the flap arranged in the intake duct initially remains in the first position and is closed only above a control signal provided.

By using a single driving device, it is possible to couple the movements of the flaps. However, this leads to a high degree of dependence between the movements of the flaps. The simultaneous movement of the flaps is subject to the fixed relationship of a mechanism coupling the movements of the flaps.

SUMMARY OF THE INVENTION

It is an object of the invention to provide a mixing valve such that the opening and closing movements of the flaps can be configured in a particularly free way.

According to an aspect of the invention, this may be achieved by virtue of the fact that the driving device has a single servomotor and a mechanism for operating the two flaps, and that a gearwheel pair driving one of the flaps has noncircular or eccentric gearwheels.

By this configuration, it is possible to produce different angular speeds of the opening and closing movements of the flaps while the driving device provides constant drive. By virtue of the invention, a linear relationship between the opening and closing movements of the jointly driven flaps is avoided. Freedom in the configuration of the opening and closing movements of the flaps can be achieved with a single servomotor through appropriate definition of the noncircularity or eccentricity of the gearwheels.

According to another advantageous development of the invention, driving the flaps at different angular speeds is made particularly simple in terms of design if one of the noncircular or eccentric gearwheels is arranged on the shaft of the flap of the intake duct, and the other of the noncircular or eccentric gearwheels is arranged on the shaft of the flap of the exhaust duct, and if the mechanism is designed for driving a single one of the noncircular or eccentric gearwheels.

According to another advantageous development of the invention, a lost motion, during which the flap of the intake duct is not pivoted as the mechanism is driven, can be produced in a simple manner if a concentric gearwheel of the mechanism is supported and a projecting control arm is secured on the shaft of the flap of the intake duct, and if the concentric gearwheel has a driving feature that can be moved against the control arm. By this configuration, the control of the intake duct and of the exhaust duct can be made particularly versatile.

According to another advantageous development of the invention, the mixing valve can be produced at a particularly low cost if the driving feature, the concentric gearwheel, and one of the noncircular or eccentric gearwheels are produced integrally.

It would be possible, for example, for the driving device driving the flaps to be of self-locking configuration and to hold the shafts in a home position. However, a backlash in the mechanism or a lost motion can lead to an inherent dynamic behavior of the flaps. According to another advantageous development of the invention, the flaps are held reliably in the envisaged position thereof if the shaft of the flap of the intake duct is preloaded into a home position by a spring element and can be deflected by the driving device against the force of the spring element.

According to another advantageous development of the invention, the outlay in terms of construction for holding the shaft of the flap of the intake duct can be kept particularly low if a holding element is secured on the shaft of the flap of the intake duct, and if the spring element supports the holding element relative to the housing.

According to another advantageous development of the invention, the assembly of the mixing valve is particularly simple if the holding element and the control arm are arranged on mutually opposite ends of the shaft of the flap of the intake duct.

According to another advantageous development of the invention, further reduction of the inherent dynamic behavior of the flaps can be achieved if the shaft of the flap of the exhaust duct is preloaded into a home position by a spring element.

BRIEF DESCRIPTION OF THE DRAWINGS

The invention allows numerous embodiments. To further clarify the basic principles thereof, one of them is illustrated in the drawings and is described below. In the drawings.

DETAILED DESCRIPTION OF THE PRESENTLY PREFERRED EMBODIMENTS

Figure 1:
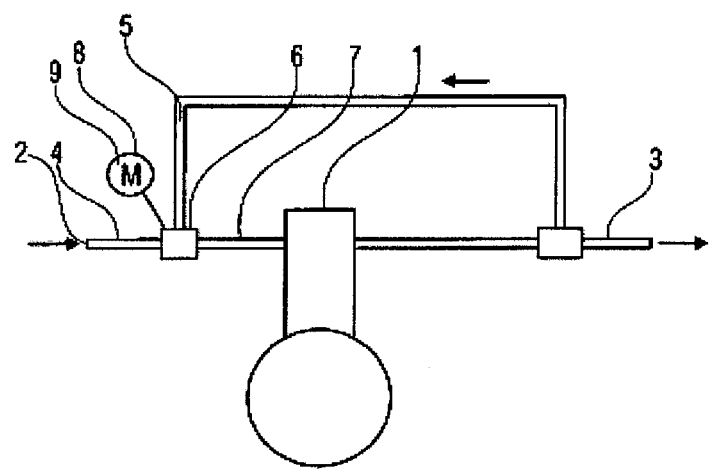
FIG. 1 shows schematically an internal combustion engine having a mixing valve according to the invention.

FIG. 1 shows schematically an internal combustion engine 1 having an intake line 2 and having an exhaust line 3. The intake line 2 has an intake duct 4, via which air from the environment is drawn in. An exhaust duct 5 leads from the exhaust line 3, via a mixing valve 6, into the intake line 2. The mixing valve 6 joins the intake duct 4 and the exhaust duct 5 together to form a combined duct 7. The combined duct 7 leads directly to the internal combustion engine 1. A driving device 8 having an electric servomotor 9 enables the mixing valve 6 to be adjusted.

Figure 2:
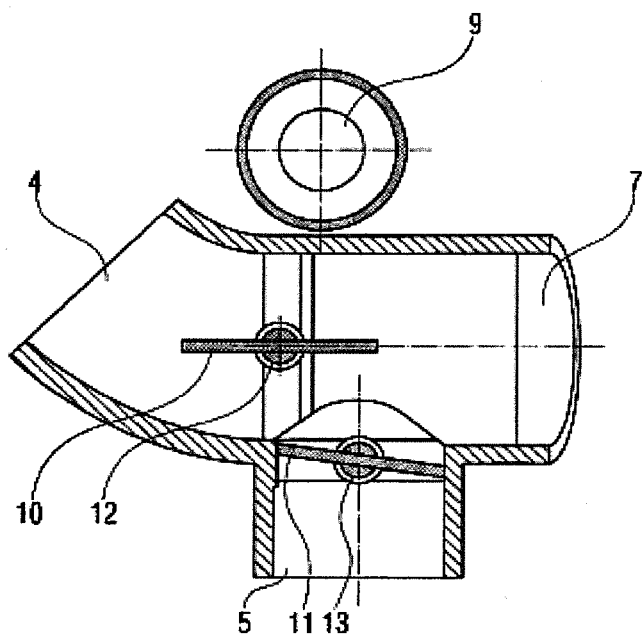
FIG. 2 shows a cross section through the mixing valve from FIG. 1.

FIG. 2 shows a sectional view of the mixing valve 6 from FIG. 1. Respective flaps 10, 11 are secured on pivotable shafts 12, 13 in the intake duct 4 and in the exhaust duct 5, respectively. The exhaust duct 5 is arranged at right angles to the intake duct 4 and the combined duct 7. The servomotor 9 is arranged on the opposite side of the combined duct 7 from the exhaust duct 5. In an alternative embodiment, which is not shown, the servomotor 9 of the driving device 8 can also be arranged in the angle between the intake duct 4 and the exhaust duct 5.

Figure 3:
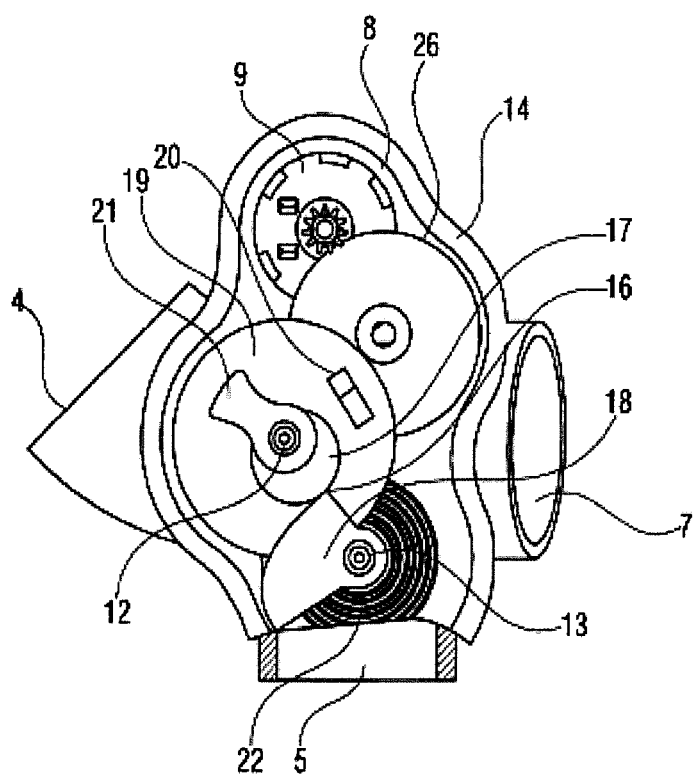
FIG. 3 shows a view of a driving device of the mixing valve.

FIG. 3 shows the mixing valve 6 in a plan view of the driving device 8. By the servomotor 9 and the driving device 8, the shafts 12, 13, and hence also the flaps 10, 11 from FIG. 2, are driven. The mixing valve 6 has a housing 14, which is shown open and which can be closed by a cover 15 illustrated in FIG. 4. The driving device 8 has a mechanism 26 for driving the shafts 12, 13 and hence the flaps 10, 11. The shaft 13 holding the flap 11 in the exhaust duct 5 can be driven by a gearwheel pair 16 having noncircular or eccentric gearwheels 17, 18. One eccentric or noncircular gearwheel 18 is arranged for conjoint rotation on the shaft 13 of the flap 11 of the exhaust duct 5. The other eccentric or noncircular gearwheel 17 is arranged for conjoint rotation on a gearwheel 19, which is mounted in a concentrically rotatable manner on the shaft 12 of the flap 10 of the intake duct 4. This concentric gearwheel 19 has a driving feature 20, which lies opposite a control arm 21 secured on the shaft 12 of the flap 10 of the intake duct 4. A spring element 22 furthermore preloads the shaft 13 of the flap 11 of the intake duct 5 into a home position. For this purpose, the spring element 22 is supported on the housing 14.

Figure 4:
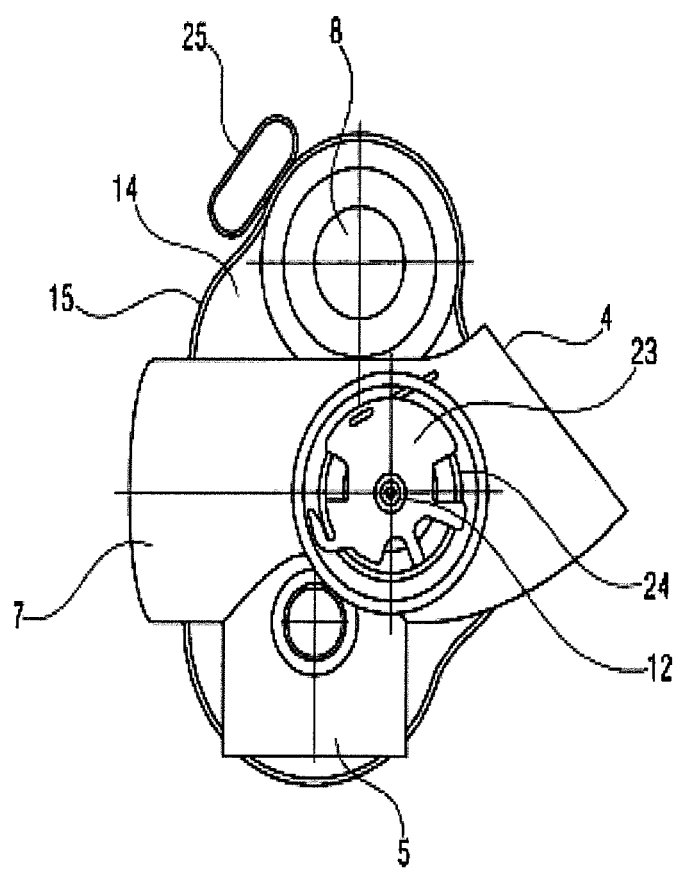
FIG. 4 shows a rear view of the mixing valve.

FIG. 4 shows the mixing valve 6 from FIG. 3 in a rear view. It can be seen here that the shaft 12 of the flap 10 of the intake duct 4 carries a holding element 23 on its end remote from the control arm 21. A second spring element 24, which is supported on the housing 14, engages on the holding element 23. The cover 15 of the housing 14, which cover covers the driving device 8 from FIG. 3, has a plug connection 25 for the power supply to the servomotor 9.

Figure 5:
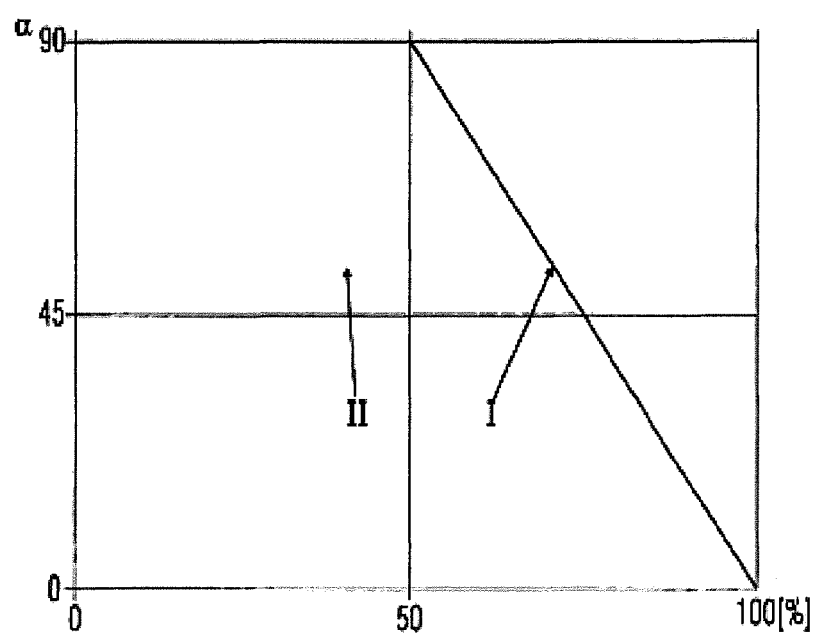
FIG. 5 shows schematically the pivoting movements of flaps of the mixing valve.

When the servomotor 9 is supplied with power, the flap 11 (illustrated in FIG. 2) of the exhaust duct 5 is first of all driven by the mechanism 26 and the noncircular or eccentric gearwheel pair 16. Because of the shape of this gearwheel pair 16, the pivoting movement does not take place in a linear relationship with the drive but in an arc, as illustrated in FIG. 5. FIG. 5 shows the opening angle α of the flaps 10, 11 over a range of motion of the driving device 8. The movement of the flap 10 arranged in the intake duct 4 is indicated by I and the movement of the flap 11 arranged in the exhaust duct 5 is indicated by II. During the movement of the concentric gearwheel 19, the flap 10 in the intake duct 4 initially remains in the open position. The driving of the flap 10 in the intake duct 4 thus has a lost motion. Once the concentric gearwheel 19 of the mechanism 26 has been turned to such an extent that the driving feature 20 moves up against the control arm 21 arranged on the shaft 12 of the flap 10 of the intake duct 4, the flap 10 in the intake duct 4 is pivoted. This pivoting movement takes place in a linear relationship with the driving by the servomotor 9, as illustrated in FIG. 5. The intake duct 4 is thus closed.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A mixing valve (6) of an internal combustion engine (1) of a motor vehicle, comprising: an intake duct (4); an exhaust duct (5); a common combined duct (7) into which the intake duct (4) and exhaust duct (5) open; an intake flap (10) arranged in the intake duct (4), the intake flap having an intake flap shaft (12) rotatably mounted in a housing (14) and holding the intake flap (10); an exhaust flap (11) arranged in the exhaust duct (5), the exhaust flap having an exhaust flap shaft (13) rotatably mounted in the housing (14) and holding the exhaust flap (11); and a drive device (8) driving the intake flap (10) and the exhaust flap (11), the driving device (8) having: a single servomotor (9), a mechanism (26) operating the intake flap (10) and the exhaust flap (11), the mechanism (26) having a concentric gearwheel (19) supported on the intake flap shaft (12), and a gearwheel pair (16), the gearwheel pair (16) having a first noncircular or eccentric gearwheel (17) and a second noncircular or eccentric gearwheel (18), the second noncircular or eccentric gearwheel (18) being arranged for conjoint rotation on the exhaust flap shaft (13) and the first noncircular or eccentric gearwheel (17) being arranged for conjoint rotation on the concentric gearwheel (19), which is mounted in a concentrically rotatable manner on the intake flap shaft (12), wherein the first non-circular or eccentric gearwheel (17) is meshed with the second non-circular or eccentric gearwheel (18) in direct engagement.

2. The mixing valve as claimed in claim 1, wherein the mechanism (26) is configured to drive a single one of the first and second noncircular or eccentric gearwheels.

3. The mixing valve as claimed in claim 2, wherein:
the mechanism (26) has the concentric gearwheel (19) supported on the intake flap shaft (12) and a projecting control arm (21) secured on the intake flap shaft (12), and the concentric gearwheel (19) has a driving feature (20) movable against the control arm (21).

4. The mixing valve as claimed in claim 3, wherein the driving feature (20), the concentric gearwheel (19) and one of the first and second noncircular or eccentric gearwheels (17, 18) are formed integrally.

5. The mixing valve as claimed in claim 4, further comprising a spring element (24), wherein the intake flap shaft (12) is preloaded into a home position by the spring element (24) and is deflectable by the driving device (8) against the force of the spring element (24).

6. The mixing valve as claimed in claim 5, further comprising a holding element (23) secured on the intake flap shaft (12), the spring element (24) supporting the holding element (23) relative to the housing (14).

7. The mixing valve as claimed in claim 6, wherein the holding element (23) and the control arm (21) are arranged on mutually opposite ends of the intake flap shaft (12).

8. The mixing valve as claimed in claim 1, further comprising a spring element (22), wherein exhaust flap shaft (13) is preloaded into a home position by a spring element (22).

\* \* \* \* \*